United States Patent
Fukushima

(10) Patent No.: US 8,565,286 B2
(45) Date of Patent: Oct. 22, 2013

(54) DESPREADING CIRCUIT AND ELECTRONIC APPARATUS

(75) Inventor: Kentaro Fukushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 732 days.

(21) Appl. No.: 12/230,688

(22) Filed: Sep. 3, 2008

(65) Prior Publication Data

US 2009/0122841 A1    May 14, 2009

(30) Foreign Application Priority Data

Nov. 12, 2007  (JP) ................................. 2007-293487

(51) Int. Cl.
  *H04B 1/707*  (2011.01)
(52) U.S. Cl.
  USPC ......................................................... 375/147
(58) Field of Classification Search
  USPC ......... 375/147, 148, 228, 234, 341, 346, 136, 375/150, 233, 242, 316; 370/342, 350, 208, 370/209, 320, 324, 479; 380/34; 455/130; 714/701
  See application file for complete search history.

(56) References Cited

U.S. PATENT DOCUMENTS

| | | | | |
|---|---|---|---|---|
| 5,790,596 | A * | 8/1998 | Sexton ........................... | 375/228 |
| 5,867,527 | A * | 2/1999 | Ziv et al. ........................ | 375/147 |
| 5,930,288 | A * | 7/1999 | Eberhardt ....................... | 375/148 |
| 2007/0127434 | A1* | 6/2007 | Heinle ........................... | 370/350 |
| 2007/0127557 | A1* | 6/2007 | Subrahmanya et al. ....... | 375/148 |

FOREIGN PATENT DOCUMENTS

| | | |
|---|---|---|
| JP | 10500553 | 1/1998 |
| JP | 11112384 | 4/1999 |
| JP | 2002290273 A | 10/2002 |
| JP | 2004-172650 A | 6/2004 |
| WO | 9627961 | 12/1996 |
| WO | 2007-035550 | 3/2007 |

OTHER PUBLICATIONS

"Excerpt from chapter 2: Discrete-Time Signals and Systems ED—John G Proakis; Dimitris G Manolakis" Digital Signal Processing. Principles, Alogorithms, and Applications (Second Edition), MacMillan Publishing Company, Jan. 1, 1988, pp. 51-54, XP007907205 ISBN: 978-0-02-396815-0.
Extended European Search Report dated Feb. 26, 2009.
Japanese Notice of Reasons for Rejection dated Oct. 11, 2011 issued in application No. 2007-293487.

* cited by examiner

*Primary Examiner* — Sam K Ahn
*Assistant Examiner* — Shawkat M Ali
(74) *Attorney, Agent, or Firm* — Smith, Gambrell & Russell, LLP

(57) ABSTRACT

For channelization codes CC#1 to CC#15, the despreading circuit comprises an FHT circuit with a spreading factor of 16 which outputs the results of despreading of an HS-PDCH. An adder is connected to the FHT circuit at an output terminal thereof corresponding to channelization code CC#0. The adder is connected to a memory to which is input the value obtained by adding an output of the FHT circuit to an output of a selector connected to the memory via a feedback line. By performing the addition 16 times in the adder, the result of despreading of a PCPICH is output.

2 Claims, 3 Drawing Sheets

DESPREADING CIRCUIT AND ELECTRONIC APPARATUS

BACKGROUND OF THE INVENTION

1. Field of the Invention

The present invention relates to a despreading circuit that receives a spread-spectrum signal and despreads the received signal at the receiving end, and an electronic apparatus incorporating the same.

2. Description of the Related Art

In recent years, communication services using High Speed Downlink Packet Access (HSDPA), a high-speed packet communication standard developed as an extension of W-CDMA (Wideband Code Division Multiple Access), have come to be provided as high-speed communication services for mobile telephones, personal computers, etc. In the services provided using HSDPA, different maximum communication speeds are defined for different service categories, and the communication speed changes according to the communication environment.

In HSDPA, each terminal receives packet data via a High Speed Physical Downlink Shared Channel (HS-PDSCH). Generally, in CDMA systems, one channel is coded by one spreading code, i.e., a channelization code, and is decoded by the same channelization code. In HS-PDSCH, however, data is split into a number of data. The split data are coded by a plurality of different channelization codes called multi-code. Since the data is split and coded for transmission, the number of data that can be simultaneously received at the terminal increases. This results in an improvement in communication speed.

For despreading of such multi-code spreading, use is often made of a Fast Hadamard Transform (FHT) circuit which performs computation between the received data and a Hadamard matrix. Despreading involves a matrix computation between a channelization code matrix and a received signal. The Hadamard matrix and the channelization code matrix coincide with each other if the rows of either one of the matrices are interchanged. This is the reason that the FHT circuit can be used for despreading.

The FHT circuit is efficient because a plurality of multi-code spread data can be decoded simultaneously. Accordingly, for HS-PDSCH, despreading is usually performed by using an FHT circuit.

On the other hand, as a pilot signal for receiving the HS-PDSCH, a primary common pilot channel (PCPICH) is also received at the same time. Since the PCPICH is not multi-coded, despreading is usually performed by using a despreader that applies the channelization code of the PCPICH, and that does not use an FHT circuit. Therefore, at the current state of the art, independent despreaders are used for HS-PDCH and for PCPICH, respectively. Using different despreaders in this way is not desirable because the amount of circuitry increases.

While a technique for reducing the amount of circuitry compared with the prior art, regardless of the number of code multiplexed signals, is proposed for use in a CDMA communication system (refer to Japanese Unexamined Patent Publication No. 2004-172650), the proposed technique is not one that solves the above problem.

SUMMARY OF THE INVENTION

In view of the above problem, it is an object of the present invention to provide a despreading circuit and an electronic appliance that can reduce the amount of circuitry while also reducing current consumption.

The despreading circuit comprises: a fast Hadamard transform circuit for outputting results of despreading of sequentially input spread-spectrum received data; and a storage unit for storing a result of despreading representing the sum of all the received data from among the results of despreading output from the fast Hadamard transform circuit, wherein the result of despreading is added up a predetermined number of times for storing in the storage unit.

The electronic apparatus is an electronic apparatus having a radio receiving section for receiving a spread-spectrum signal, the radio receiving section having a despreading circuit comprising: a fast Hadamard transform circuit for outputting results of despreading of sequentially input spread-spectrum received data; and a storage unit for storing a result of despreading representing the sum of all the received data from among the results of despreading output from the fast Hadamard transform circuit, wherein the result of despreading is added up a predetermined number of times for storing in the storage unit.

The despreading circuit may further comprise an adder interposed between the fast Hadamard transform circuit and the storage unit, a selector connected to an output of the storage unit, and a feedback circuit for feeding back an output of the selector to the adder; in this case, when the result of despreading stored in the storage unit has been output the predetermined number of times, the selector may subsequently output zero.

The fast Hadamard transform circuit may be a fast Hadamard transform circuit that supports a spreading factor of 16; in this case, when the result of despreading has been output 16 times, the selector may subsequently output zero.

The result of despreading output from the fast Hadamard transform circuit as representing the sum of all the received data may represent, when added up 16 times, the result of despreading of a primary common pilot channel, and the other results of despreading output from the fast Hadamard transform circuit may represent the results of despreading of a high speed physical downlink shared channel.

The despreading circuit and the electronic apparatus thus configured can reduce the amount of circuitry while also reducing current consumption.

DETAILED DESCRIPTION OF THE PREFERRED EMBODIMENT

An embodiment will be described below with reference to drawings, but before that, an explanation will be given of the reason why HS-PDCH and PCPICH cannot be simply processed by a single FHT circuit.

Figure 1:
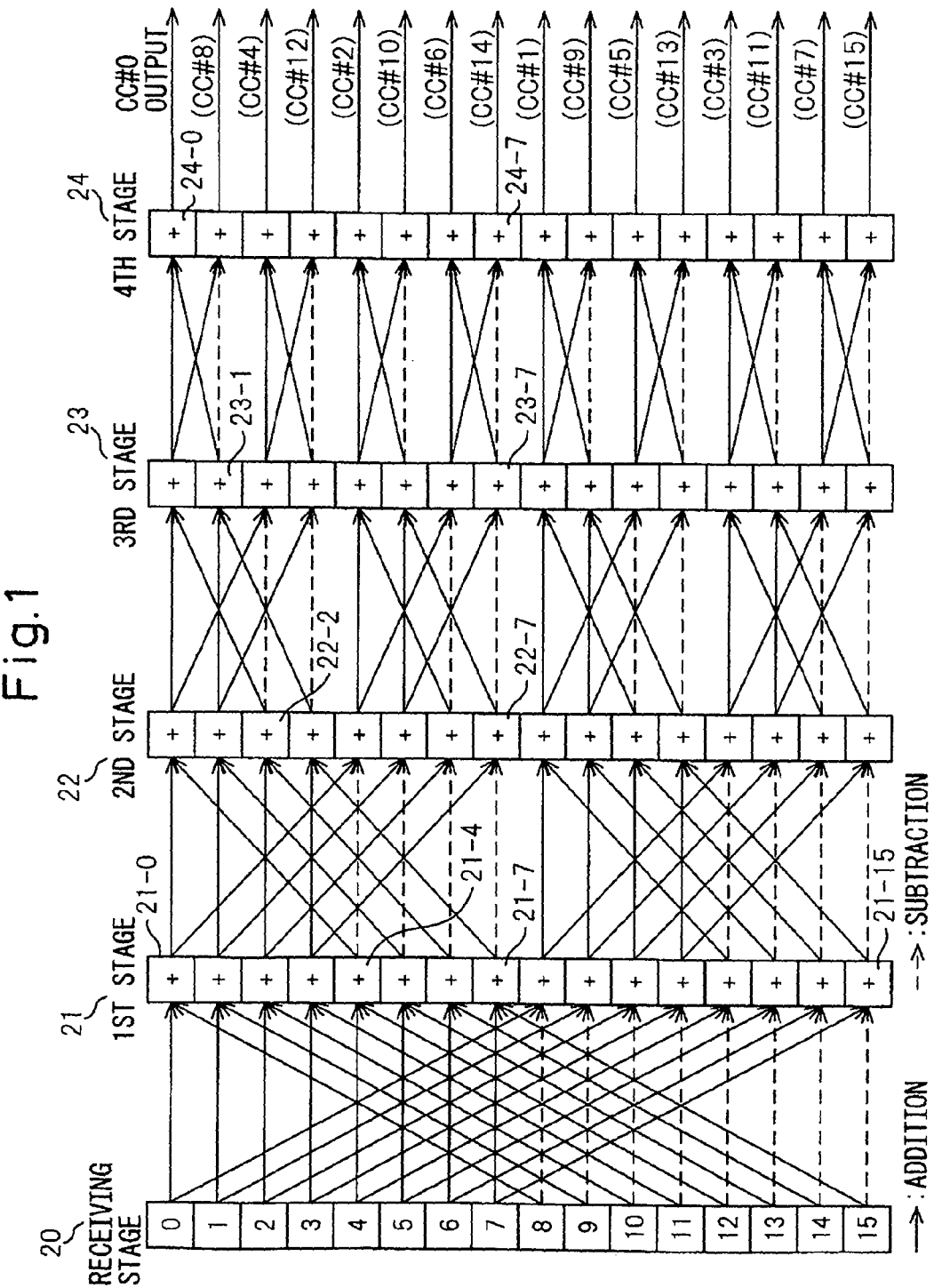
FIG. 1 is a diagram showing a computation procedure performed by an FHT circuit (SF=16) subsumed under the present embodiment.

FIG. 1 is a diagram showing a computation procedure performed by an FHT circuit dedicated to HS-PDSCH whose spreading factor (SF) is 16 (SF=16), as an example of the present embodiment. Generally, the FHT circuit is constructed by combining a plurality of stages of butterfly computation circuits. The number of stages necessary for despreading differs depending on the spreading factor. Since the spreading factor (SF) of the HS-PDSCH is 16, four butterfly computation stages become necessary in the FHT circuit. As shown in FIG. 1, the FHT circuit dedicated to HS-PDSCH comprises a receiving stage 20 and first to fourth stages 21 to 24. With this configuration, the results of despreading corresponding to all the channelization codes CC#0 to CC#15 are output at the fourth stage.

A large number of chip data being input in time series are divided at every 16 chips, and the resulting received data 0 to 15 are input to the receiving stage 20. Then, butterfly computations at the first stage 21 are performed as shown in FIG. 1. In FIG. 1, a solid line indicates an addition, while a dashed line indicates a subtraction. For example, first-stage data 21-0 is the result of the addition of the received data 0 and 8. On the other hand, first-stage data 21-15 is the result of the subtraction of the received data 15 from the received data 7. Second-stage data 22-0 is the result of the addition of the first-stage data 21-0 and 21-4, and third-stage data 23-0 is the result of the addition of the second-stage data 22-0 and 22-2. Finally, fourth-stage data 24-0 is calculated as the result of the addition of the third-stage data 23-0 and 23-1.

For example, first-stage data 21-7 is the result of the addition of the received data 7 and 15. On the other hand, first-stage data 21-15 is the result of the subtraction of the received data 15 from the received data 7. Second-stage data 22-7 is the result of the subtraction of the first-stage data 21-7 from the first-stage data 21-2, and third-stage data 23-7 is the result of the addition of the second-stage data 22-7 from the second-stage data 22-5. Finally, fourth-stage data 24-7 is calculated as the result of the subtraction of the third-stage data 23-7 from the third-stage data 23-6. The fourth-stage data 24-7 represents the result of despreading corresponding to CC#14. In this way, the outputs appearing at the fourth stage of the FHT correspond to CC#0, CC#8, CC#4, CC#12, CC#2, CC#10, CC#6, CC#14, CC#1, CC#9, CC#5, CC#13, CC#3, CC#11, CC#7, and CC#15 in this order from the top to the bottom of the figure.

Figure 2:
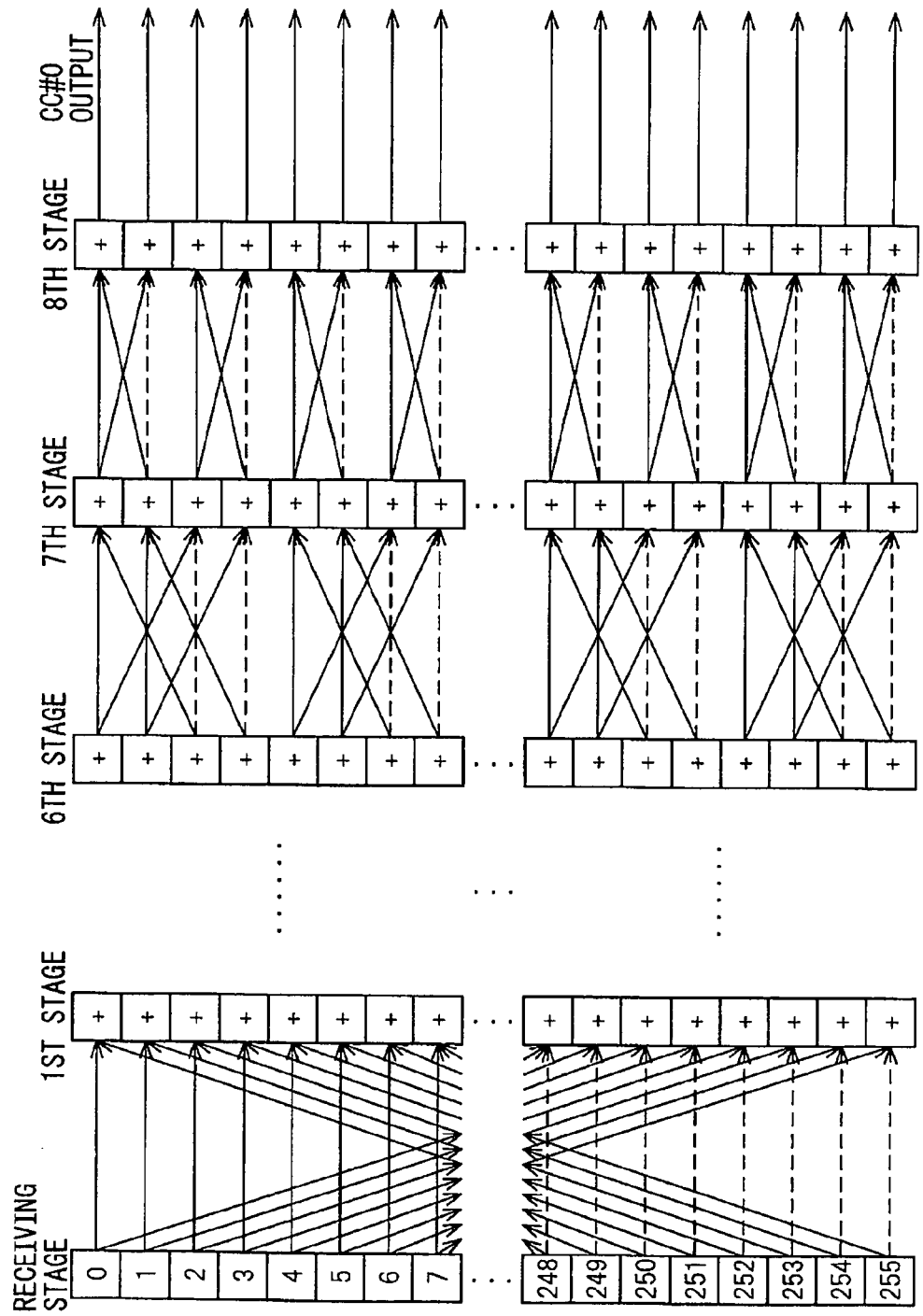
FIG. 2 is a diagram showing for reference a computation procedure performed by an FHT circuit (SF=256).

If PCPICPH is to be processed by an FHT circuit, eight stages become necessary since the spreading factor is 256. FIG. 2 is a diagram showing the computation procedure of the eight-stage FHT circuit for reference. Despreading is performed by performing eight stages of butterfly computations based on 256 received data. Such being the case, two FHT circuits with different stages cannot be simply implemented in a single FHT circuit.

Incidentally, since the channelization code CC#0 is assigned to the PCPICH, the output that the FHT circuit with SF=256 produces for the channelization code CC#0 provides the result of despreading of the PCPICH. In other words, the result of despreading of the PCPICH is simply equal to the sum of the data 0 to 255. The present embodiment utilizes the fact that the result of despreading by the channelization code CC#0 does not involve any data subtraction but wholly consists of additions. That is, in the case of SF=16, the result of despreading by the channelization code CC#0 will be given as the sum of the 16 data. Accordingly, if the sum of the 16 data is added up 16 times, the sum of 256 data will be obtained which represents the result of despreading of the PCPICH.

This will be explained using mathematical expressions. As described above, in the FHT circuit with SF=256, the output corresponding to the channelization code CC#0 is equal to the sum of the 256 received data. Here, let $DT_n$ denote the received data and $FHT_{256}OUT_i$ the output that the FHT circuit with SF=256 produces for the channelization code CC#0. Then $$FHT_{256}OUT_i = \Sigma_{n=i\times 256}^{i\times 256+255} DT_n (i=0,1,2,\ldots) \quad (1)$$

On the other hand, in the FHT circuit with SF=16, the output corresponding to the channelization code CC#0 is equal to the sum of the 16 received data. Here, if the output that the FHT circuit with SF=16 produces for the channelization code CC#0 is denoted by $FHT_{16}OUT_i$, then $$FHT_{16}OUT_i = \Sigma_{n=i\times 16}^{i\times 16+15} DT_n (i=0,1,2,\ldots) \quad (2)$$

The received data are sequentially input, 16 data at a time, to the FHT circuit with SF=16, which then outputs the results of the computations. Accordingly, if the output that the FHT circuit with SF=16 produces for the channelization code CC#0 is successively added up 16 times, the result is the same as the output that the FHT circuit with SF=256 produces for the channelization code CC#0.

$$FHT_{256}OUT_0 = \Sigma_{i=0}^{15} FHT_{16}OUT_i =$$
$$\Sigma_{i=0}^{15} \Sigma_{n=i\times 16}^{i\times 16+5} DT_n \quad (3)$$

As a specific example, consider $FHT_{256}OUT_0$ with i=0. Then $$FHT_{256}OUT_0 = DT_0 + DT_1 + \ldots DT_{255} \quad (4)$$

$$FHT_{16}OUT_0 = DT_0 + DT_1 + \ldots DT_{15} \quad (5)$$

$$FHT_{16}OUT_1 = DTL_{16} + DT_{17} + \ldots DT_{31} \quad (6)$$

$$\ldots$$

$$FHT_{16}OUT_{15} = DT_{240} + DT_{241} + \ldots DT_{255} \quad (7)$$

$$FHT_{256}OUT_0 = FHT_{16}OUT_0 +$$
$$FHT_{16}OUT_1 + \ldots + FHT_{16}OUT_{15} \quad (8)$$

As shown above, the output of $FHT_{256}$ corresponding to the channelization code CC#0 is equal to the result obtained by adding up the output of $FHT_{16}$ corresponding to the channelization code CC#0 16 times.

Figure 3:
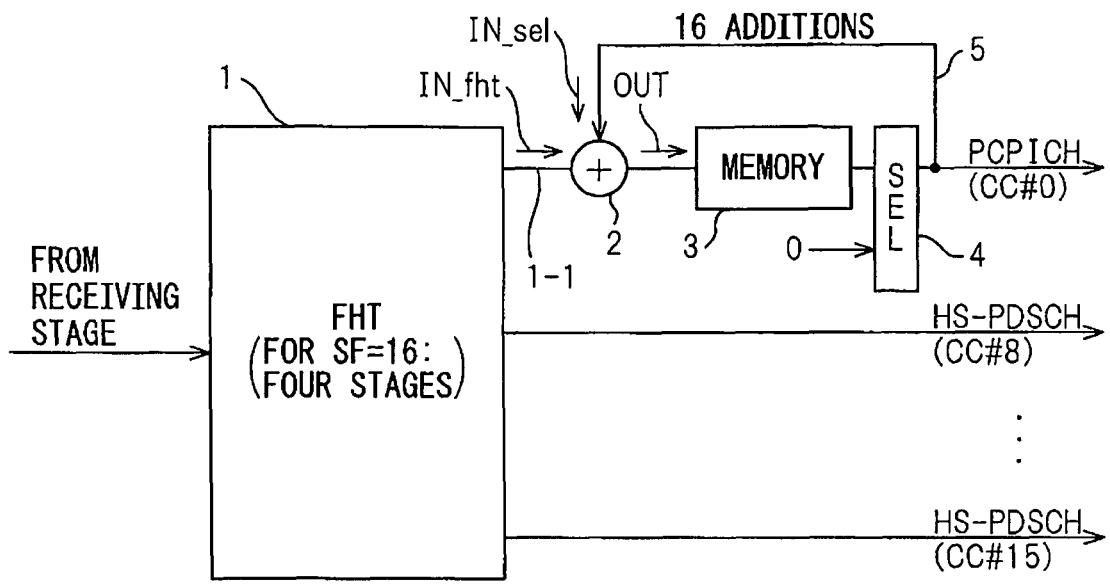
FIG. 3 is a diagram showing a despreading circuit according to the present embodiment.

FIG. 3 is a diagram showing a despreading circuit for HS-PDCH and PCPICH according to the present embodiment. For the channelization codes CC#1 to CC#15, the despreading circuit comprises an FHT circuit 1 with a spreading factor of 16 which outputs the results of despreading of the HS-PDCH. An adder 2 is connected to the FHT circuit 1 at an output terminal 1-1 thereof corresponding to the channelization code CC#0. The adder 2 is connected to a memory 3 to which an output from the FHT circuit 1 and an output from a selector 4 connected to the memory 3 are input via a feedback line 5.

Here, let IN_fht denote the input to the adder 2 from the FHT circuit 1, IN_sel the input to the adder 2 from the selector, and OUT the output of the adder 2. Then OUT=IN_fht+IN_sel If the output from the FHT circuit 1 is denoted by d(i) (i=0 to 15), the first output from the adder is given as OUT=d(0)+0=d(0)

Since this OUTPUT (=d(0)) is held in the memory 3 and provides the next IN_sel, the second output from the adder 2 is given as OUT=d(1)+d(0)=d(0)+d(1)

Since this OUTPUT (=d(0)+d(1)) provides the next IN_sel, the output from the adder 2 is successively added, and finally, the 16th output is given as OUT=d(0)+d(1)+ . . . +d(14)+d(15)

This is equivalent to adding up the output of the FHT circuit 16 times.

Since the number of additions required to obtain the result of despreading of the PCPICH is 16, when the 16th addition ends, a reset must be done before starting a new series of additions. For this purpose, when the 16th addition ends, a 0 is applied to the other input of the selector 4 which, in response, selects 0 for output, not the value held in the memory. The application of the 0 to the selector can be effected based on the count value obtained by counting the 16 additions. Thereupon, the output of the selector 4, i.e., IN_sel, is reset to 0, and a new series of 16 additions is initiated.

In this way, the selector 4 usually outputs the value stored in the memory 3, and the result of the despreading by the channelization code CC#0 is successively input via the line 5 and added for input to the memory 3. Then, after completing the 16 additions, i.e., the addition of 256 bits, a 0 is applied to the other input of the selector. As a result, 0 is input to the adder 2, to start the next series of 16 additions.

The above embodiment has been described by taking HS-PDSCH as an example, but the invention can also be applied to signals despread by multi-code for transmission on DPCH (Dedicated Physical Data Channel). However, since the spreading factor of DPCH is variable, the despreader circuit must be adapted accordingly. For example, an FHT circuit must be provided for each SF, though it is not desirable from the standpoint of reducing the amount of circuitry.

As described above, in the despreader circuit of the present embodiment, the output that the single FHT circuit produces for the channelization code CC#0 is added up a predetermined number of times, thereby making it possible to simply process HS-PDSCH and PCPICH by the same FHT circuit and thus eliminating the need to provide different despreader circuits for them. As a result, a circuit configuration can be achieved that is compact and that can reduce power consumption.

Figure 4:
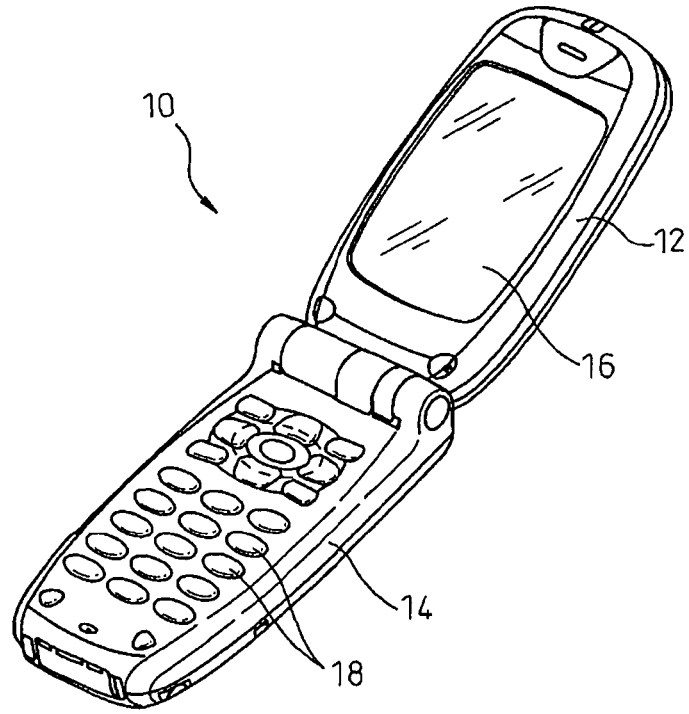
FIG. 4 is a diagram showing one example of an electronic apparatus capable of incorporating the despreading circuit according to the present embodiment.

The despreading circuit of the present embodiment can be incorporated into a radio receiver section of an electronic apparatus such as a portable telephone, a PDA (Personal Digital Assistant), a notebook computer, and other information processing apparatus. FIG. 4 shows an external view of a portable telephone as an example of the electronic apparatus incorporating the despreading circuit of the present embodiment. The portable telephone 10 shown in FIG. 4 as an example of the electronic apparatus is a folding type portable telephone comprising first and second cases 12 and 14 joined together so that one can be turned to open and close relative to the other. The first case 12 has a display unit 16 on its inside surface. The second case 14 has pushbuttons 18 and other operating means that can be used to enter alphanumeric characters, etc. By incorporating the despreading circuit of the present embodiment into such a portable telephone 10, an electronic apparatus can be achieved that is compact and that can reduce power consumption.

What is claimed is:

1. A despreading circuit comprising: a fast Hadamard transform (FHT) circuit for a spreading factor of n that outputs results of despreading a plurality of sequentially input spread-spectrum received data; a storage unit that stores a result of despreading a channelization code representing a sum of all the received data of the results of despreading output from the FHT circuit; an adder interposed between the FHT circuit and the storage unit; a selector that is connected to an output of the storage unit and that outputs the stored result of despreading the channelization code representing the sum of all the received data; and a feedback circuit that feeds back an output of the selector to the adder, wherein when the stored result of despreading the channelization code representing the sum of all the received data has been output n-times, the n being the spreading factor, the selector subsequently outputs zero to obtain the result of despreading a pilot channel, the result of despreading the pilot channel being n-times addition of the result of despreading the channelization code representing the sum of all the received data, and the result of despreading output from the FHT circuit as representing the sum of all the received data represents, when added up 16 times, the result of despreading of a primary common pilot channel (PCPICH), and the other results of despreading output from the FHT circuit represents the results of despreading of a high speed physical downlink shared channel (HS-PDSCH).

2. An electronic apparatus having a radio receiving section for receiving a spread-spectrum signal, the radio receiving section having a despreading circuit comprising: a fast Hadamard transform (FHT) circuit of a spreading factor of n that outputs results of despreading a plurality of sequentially input spread-spectrum received data; a storage unit that stores a result of despreading a channelization code representing a sum of all the received data of the results of despreading output from the FHT; an adder interposed between the FHT circuit and the storage unit; a selector that is connected to an output of the storage unit and that outputs the stored result of despreading the channelization code representing the sum of all the received data; and a feedback circuit that feeds back an output of the selector to the adder, and wherein when the stored result of despreading the channelization code representing the sum of all the received data has been output n-times, the n being the spreading factor, the selector subsequently outputs zero to obtain the result of despreading a pilot, the result of despreading the pilot channel being n-times addition of the result of despreading the channelization code representing the sum of all the received data, and the result of despreading output from the FHT circuit as representing the sum of all the received data represents, when added up 16 times, the result of despreading of a primary common pilot channel (PCPICH), and the other results of despreading output from the FHT circuit represent the results of despreading of a high speed physical downlink shared channel (HS-PDSCH).

* * * * *